United States Patent [19]

Carter

[11] Patent Number: 4,506,740
[45] Date of Patent: Mar. 26, 1985

[54] VIBRATING EARTH RIPPING APPARATUS

[76] Inventor: Orvil L. Carter, Rte. 2, Box 0, Canadian, Tex. 79014

[21] Appl. No.: 471,223

[22] Filed: Mar. 2, 1983

[51] Int. Cl.³ .................. A01B 13/08; A01B 49/02
[52] U.S. Cl. .................................. 172/40; 172/68; 172/78; 172/180
[58] Field of Search ............. 172/40, 68, 78, 118, 172/196, 599, 180; 404/90, 113, 117

[56] References Cited

U.S. PATENT DOCUMENTS

| | | | |
|---|---|---|---|
| 3,103,250 | 9/1963 | Lamb | 172/40 |
| 3,211,236 | 10/1965 | Patton | 172/40 |
| 3,339,641 | 9/1967 | Carter | 172/40 |
| 3,398,798 | 8/1968 | Shelton | 172/40 X |
| 3,498,384 | 3/1970 | Ogura | 172/40 |
| 4,079,593 | 3/1978 | Flippin | 172/40 X |
| 4,227,578 | 10/1980 | Hurt | 172/40 |

FOREIGN PATENT DOCUMENTS

| | | | |
|---|---|---|---|
| 369256 | 2/1923 | Fed. Rep. of Germany | 172/40 |
| 150681 | 9/1981 | German Democratic Rep. | 172/118 |

Primary Examiner—Richard T. Stouffer
Attorney, Agent, or Firm—William R. Laney

[57] ABSTRACT

A vibrating earth ripping machine which includes a main frame and a vibrating frame which is pivotally connected to the main frame by a pair of movable thrust absorbing arms. The vibrating frame extends beyond the main frame rear end, and is secured to a transversely extending tool bar having a plurality of downwardly projecting ripper tines detachably secured thereto. A mass is rotatably mounted on the tool bar for eccentric mass distribution during rotation about a horizontal axis. A resilient vibration damping system is mounted between the main frame and vibrating frame to damp vibratory movement imparted to the vibrating frame by the rotating mass.

13 Claims, 8 Drawing Figures

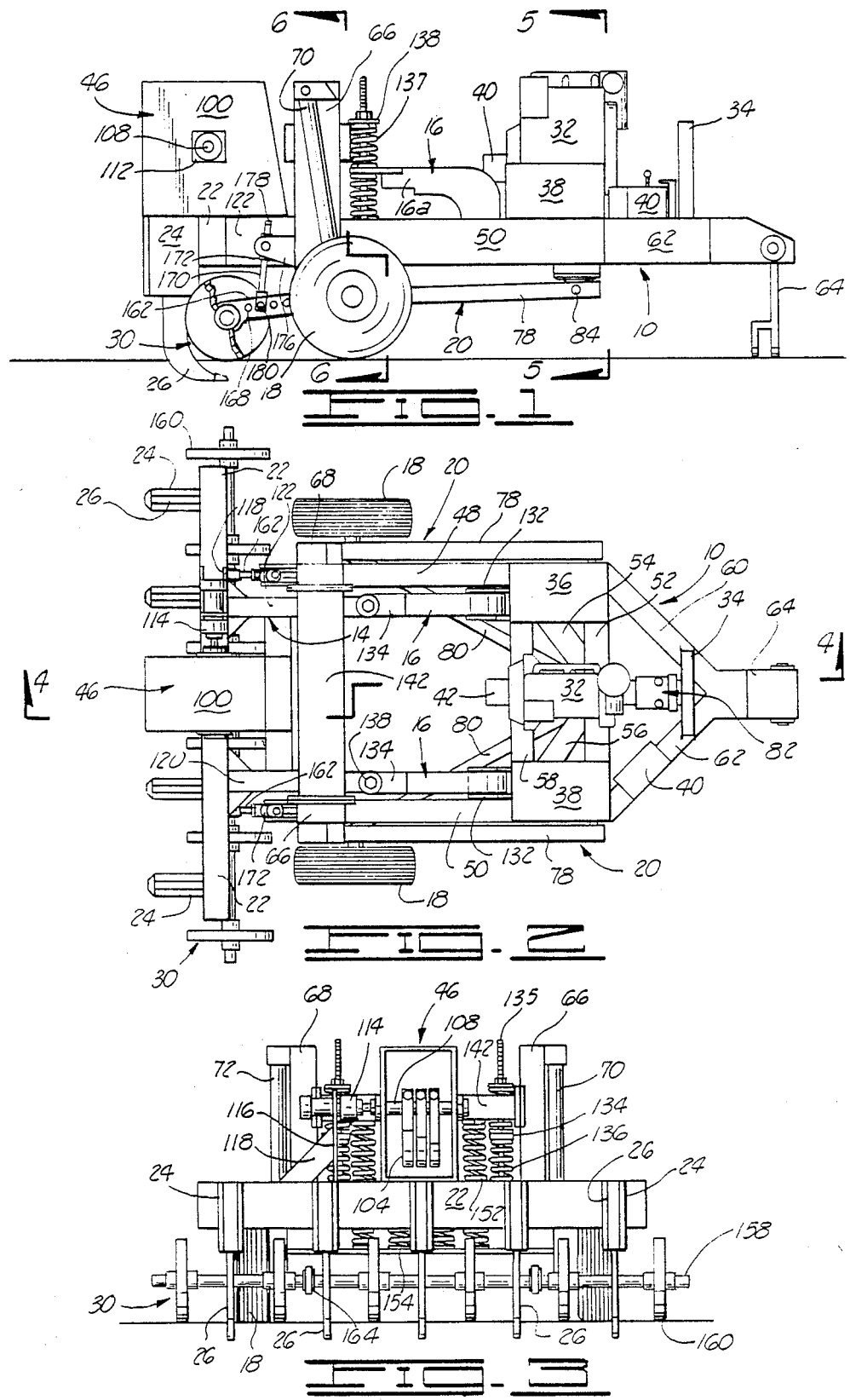

VIBRATING EARTH RIPPING APPARATUS

BACKGROUND OF THE INVENTION

1. Field of the Invention

This invention relates to plowing and earth ripping devices, and more particularly, to vibrating plows or rippers in which the conventional forward movement of tines or ripper blades through the earth is combined with an oscillating or vibrating movement of the blades or tines to enhance the earth breaking and ripping efficiency of the apparatus.

2. Brief Description of the Prior Art

In my U.S. Pat. No 3,339,641, issued Sept. 5, 1967 and entitled "VIBRATING PLOW", I disclosed a ripper apparatus which functions effectively for breaking up hardpan or, in industrial applications, for breaking and fragmenting old pavement when it is desired to re-surface roadways, parking lots or the like.

Several forms of the apparatus are illustrated and described in my patent, but each basically includes a primary or main frame adapted to be towed behind a towing vehicle, and having a vibrating frame pivotally mounted thereon for pivotation about a horizontal axis as the vibrating frame undergoes an up and down vibrating movement. The vibrating frame, in one form of the vibrating plow there illustrated, has an elongated, tranversely extending tool bar connected across the vibrating frame at the rear end of the machine. A plurality of tines or ripper blades are detachably connected to the tool bar for penetration of the earth during operation of the machine. As the vibrating plow or ripper is pulled forward by the towing vehicle, the ripper blades are pulled through the earth in a horizontal direction, and are concurrently caused to undergo an up and down vibrating movement in which the blades act as vertically impacting chisels. This compound motion effectively fragments or fractures the earth, and has been found highly useful in breaking up hardpan for agricultural purposes, or in fracturing old pavement where pavement removal is desired preparatory to re-surfacing a roadway.

A number of other types of vibrating plows or earth ripping devices which employ an oscillating or vibrating motion imparted to chisel blades or rippers have been developed. Among these, several have been patented and are illustrated in Talbert U.S. Pat. No. 2,935,140; Patton U.S. Pat. No. 3,211,236; Harshberger U.S. Pat. No. 2,792,769; Hubert U.S. Pat. No. 939,132; Talbert U.S. Pat. No. 3,106,968; Lamb U.S. Pat. No. 3,103,250; German Pat. No. 369,256 and published Australian Patent Applicaton No. 5123/26.

Two principal difficulties have been experienced in utilizing the vibrating plow apparatus described in my prior U.S. Pat. No. 3,339,641. One of these difficulties is the propensity of the plow, when used for ripping asphalt and similar surface encrustations of limited frangibility, to fracture the asphalt in large chunks or plates. The large size of the asphalt plates renders the further processing of the asphalt difficult, particularly the loading of the asphalt into trucks for transport to a reclamation facility.

Another difficulty which has characterized the use of my vibrating plow has been the extent to which a forwardly directed horizontal component of force developed during the vibration of the plow is transmitted from the plow apparatus to the towing apparatus. This force tends to periodically impart a shoving or pushing motion to the towing apparatus, thereby imposing certain mechanical stresses on the towing vehicle which are undesirable. Moreover, such forwardly imparted imtermittent or oscillatory motion greatly increases the discomfort of the operator of the towing vehicle, and decreases the uniformity with which the vibrating tines or blades fracture the soil or asphalt through which they are moving.

BRIEF DESCRIPTION OF THE INVENTION

The present invention is an improved vibrating plow or ripping apparatus which minimizes the amount of vibratory jolting motion transmitted from the main chassis or frame of the vibrating plow to a vehicle by which the plow is towed. The apparatus can be modified, through use of an attachment forming a part of the invention, to fragment asphaltic or the like surfaces into relatively small fragments or chunks when the apparatus of the invention is used for chiseling such surfaces in order to remove hard, frangible surfacing materials of this sort.

Broadly described, the apparatus of the invention comprises a main frame or chassis which is adapted for towing behind a crawler-type tractor, or an agricultural tractor, or the like, and which is adjustably supported on ground engaging wheels. Pivotally connected to the main frame through a pair of movable, thrust absorbing arms is a vibrating frame. Upward and downward pivotal movement of the vibrating frame about a horizontal pivotal axis is opposed by a resilient vibration damping system which is positioned between the main frame and the vibrating frame.

At its rear end, the vibrating frame is connected to a transversely extending tool bar which serves to detachably mount a plurality of horizontally spaced chisel blades or tines, and also to support a rotatably mounted mass or weight which is eccentrically disposed with respect to its axis of rotation. Means are provided for raising and lowering the ground engaging wheels in relation to the main frame in order to set the chisel blades into the earth, a fine adjustment control mechanism can be included in some embodiments to facilitate relatively slight or small adjustments in the depth to which the tines or blades will penetrate the soil.

As an aid in controlling the fracturing or breaking action of the tines or blades, a disc delineator subassembly is attachable to the main frame of the apparatus and is vertically adjustable in its position relative to the main frame.

An important object of the present invention is to provide an improved vibrating plow or ripping machine which can be towed behind a towing vehicle with less discomfort to the operator of the towing vehicle, and with less wear and mechanical stress imparted to the towing vehicle in consequence of the transference of vibratory jolting motion from the plow to the towing vehicle, than is developed in other types of vibrating plow devices.

Another object of the invention is to provide an improved vibratory plow or ripping apparatus which can be effectively used for ripping up and breaking asphalt, concrete or similar surfacing materials into a form and size rendering the fractured surfacing material more handlable and susceptible of disposition than the product yielded through the use of generally similar types of ripping devices previously employed.

A further object of the invention is to provide an improved chisel plow and earth ripping machine which is characterized by excellent mechanical strength and stability, and by extended operating life, and which is relatively easy to maintain and service.

Additional objects and advantages of the invention will become apparent as the following description of the invention is read in conjunction with the accompanying drawings which illustrate a preferred embodiment of the invention.

GENERAL DESCRIPTION OF THE DRAWINGS

FIG. 1 is a side elevation view of a preferred embodiment of vibrating earth ripping apparatus constructed in accordance with the present invention.

FIG. 2 is a top plane view of the earth ripping apparatus depicted in FIG. 1.

FIG. 3 is a rear elevation view of the earth ripping apparatus depicted in FIG. 1.

DETAILED DESCRIPTION OF A PREFERRED EMBODIMENT OF THE INVENTION

Figure 4:
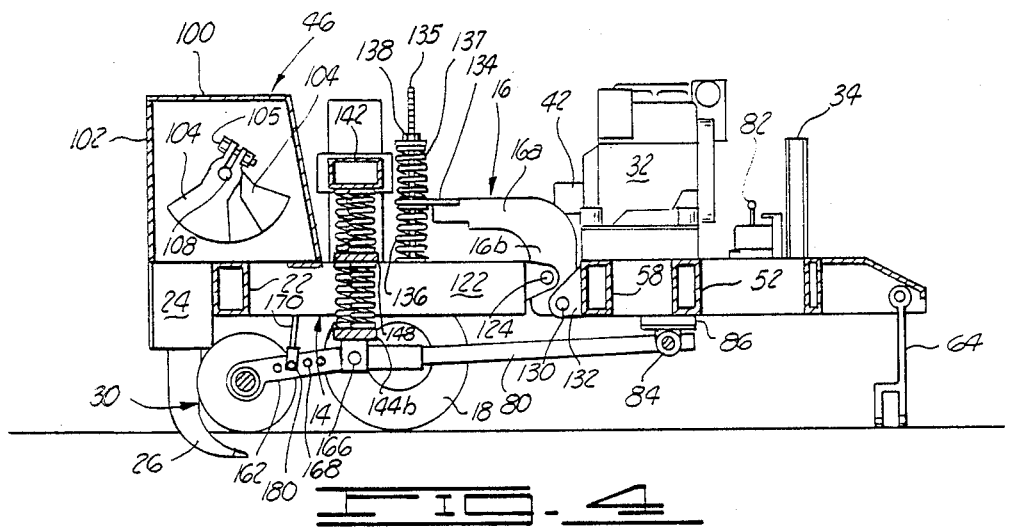
FIG. 4 is a longitudinal sectional view taken along line 4—4 on FIG. 2.

Referring initially to FIG. 1 of the drawings, an earth ripping apparatus constructed in accordance with the present invention includes a main frame or chassis, designated generally by reference numeral 10, and a vibrating frame 14 which is pivotally connected to the main frame through a pair of moveable thrust absorbing arms 16. The main frame or chassis 10 is supported upon a pair of laterally spaced ground engaging wheels 18 which are secured to the rear ends of a pair of A-frame subassemblies each designated generally by reference numeral 20. The forward end of each A-frame assembly 20 is pivotally supported from the main frame 10 in a manner hereinafter described.

At its rear end, the vibrating frame 14 is secured to a transversely extending tool bar 22. The tool bar 22 carries a plurality of rearwardly extending pairs of plates or brackets 24. As shown in FIGS. 1, 3 and 4, each bracket pair 24 receives the upper end portion of the shank of a downwardly and forwardly curved chisel blade or tine 26. Near the rear end of the earth ripping apparatus, a disc delineator subassembly, designated generally by reference numeral 30, is provided, and functions in cooperation with the tines or blades 26 for pulverizing or breaking up the soil or pavement subjected to the action of the apparatus in a manner hereinafter described.

Mounted upon the main frame 10 near the forward end thereof are an engine 32 having a radiator 34 associated therewith, a hydraulic fluid reservoir tank 36, a fuel tank 38 and a storage battery 40. An output power shaft from the engine 32 drives a hydraulic pump 42. The hydraulic pump 42 supplies hydraulic power for operating the ripping apparatus in a manner hereinafter described.

In order to impart an oscillatory or vibratory motion through the tool bar 22 to the tines or blades 26, a rotating weight subassembly 46 is mounted on the upper side of the tool bar 22, and will be hereinafter described in greater detail.

Having broadly alluded to the various major components and subassemblies which are included within the earth ripping apparatus of the present invention, these several subassemblies will now be described in greater detail. The main frame or chassis 10 includes a pair of rearwardly extending, substantially parallel side frame elements 48 and 50. The side frame elements 48 and 50 are interconnected at their forward ends by a first transversely extending frame member 52. There are further included in the main frame or chassis a pair of diagonal convergent frame elements 54 and 56. At the forward end of the main frame or chassis, a yolk is formed by a pair of converging frame yolk elements 60 and 62 which converge at their forward ends and are there joined to a towing tongue subassembly 64. The towing tongue subassembly 64 is provided to facilitate towing of the earth ripping apparatus by a suitable towing vehicle, such as a crawler tractor or an agricultural tractor (not shown).

Figure 5:
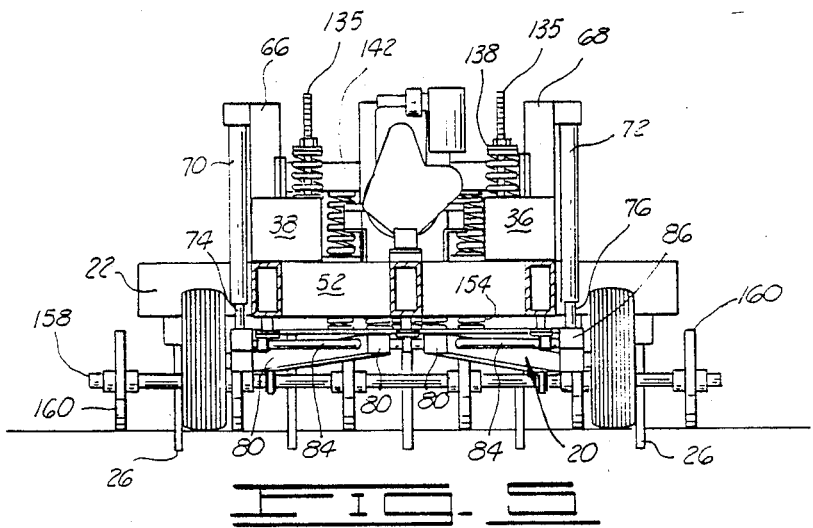
FIG. 5 is a sectional view taken along line 5—5 of FIG. 1.
Figure 6:
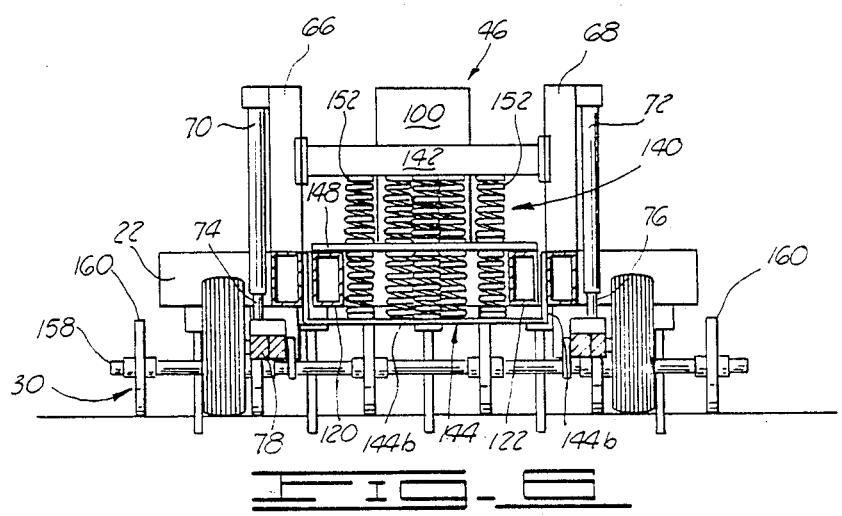
FIG. 6 is a sectional view taken along line 6—6 on FIG. 1.

Near the rear end of the main frame or chassis 10, a pair vertically extending, parallel stanchions or upright members 66 and 68 are provided at opposite sides of the main frame, and project upwardly from the upper side of the side frame members 48 and 50. The stanchions 66 and 68 provide points of securement for the upper ends of hydraulic cylinders 70 and 72, respectively. As best illustrated in FIGS. 5 and 6, the hydraulic cylinders 70 and 72 have associated therewith, extensible piston rods 74 and 76, respectively. Each of the piston rods 74 and 76 is connected at its free lower end to a forwardly extending frame element 78 forming a part of one of the A-frame subassemblies 20 by which each of the wheels 18 is pivotally supported on the main frame 10. An inwardly and forwardly extending frame element 80 is the remaining major structural element of each A-frame. Power for the operation of the hydraulic cylinders 70 and 72 to extend and retract the piston rods 74 and 76 is supplied by the hydraulic pump 42, which provides hydraulic fluid to the cylinders via a suitable valve control system designated generally by reference numeral 82.

The A-frames 20 by which the ground engaging wheels 18 are supported on the main frame 10 project forwardly from the ground engaging wheels and are pivotally secured beneath the main frame 10 by means of a horizontally and transversally extending pivot shaft 84 (see FIG. 5). The pivot shaft 84 is journaled at its opposite ends in journal brackets 86 secured to the underside of the frame as shown in FIGS. 4 and 5.

In order to elevate and lower the main frame 10 with respect to the ground engaging wheels 18, a valve on the control panel 82 is shifted to permit hydraulic fluid to be directed to the cylinders 70 and 72. This extends the piston rods 74 and 76 and causes the main frame to be elevated a greater distance above the ground engaging wheels 18. This in turn will extract the chisel tines or blades 26 from the earth so as to place the earth ripping apparatus in an over-the-road or transport status. The reverse actuation of the hydraulic cylinders 70 and 72 is effected when it is desired to lower the tines or blades 26 into the earth to a selected depth. Thus, in this instance, the piston rods 74 and 76 are retracted into the cylinders 70 and 72 so that the main frame 10 and the vibrating frame 14 carried thereon are lowered relative to the wheels, and the blades or tines 26 are accordingly set into the earth.

Figure 7:
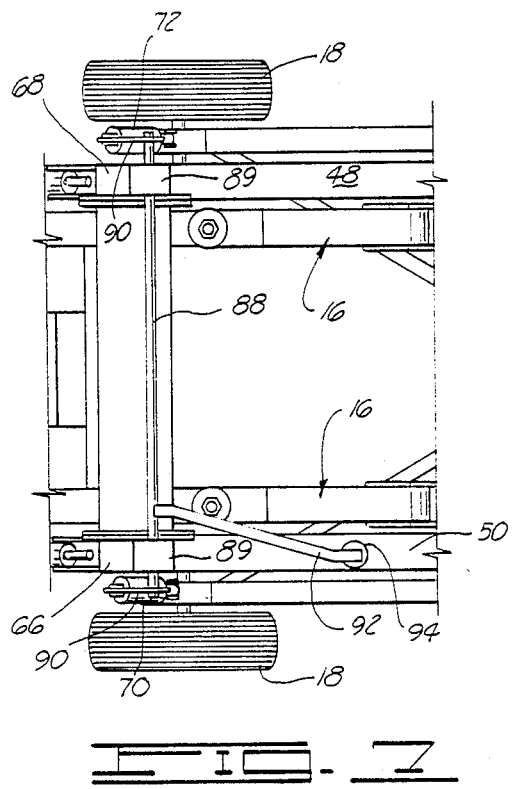
FIG. 7 is a partial plan view of a modified embodiment of the earth ripping apparatus.
Figure 8:
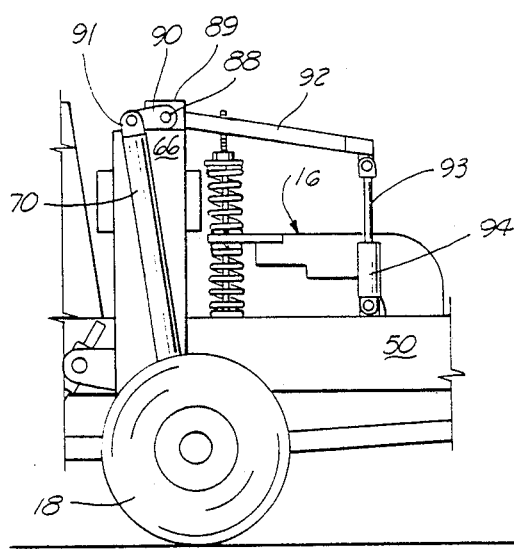
FIG. 8 is a partial side elevation view of that part of a modified embodiment which is illustrated in FIG. 7.

On some occasions, it is desirable to provide for a fine or precision adjustment of the position of the tines in the earth. A modified embodiment of the ripping apparatus for accomplishing this purpose is illustrated in FIGS. 7 and 8. Fine adjustment of the precise position of the tips or points at the lower end of the blades or tines 26 with respect to the earth is achieved, in the modified embodiment, by means of a fine adjustment subassembly 87 provided in association with hydraulic cylinders 70 and 72. The fine adjustment subassembly 87 includes a rocker shaft 88 which projects across the upper ends of the two stanchions 66 and 68 and is journaled in bearings 89 secured to the top of these structures. At its opposite ends, the rocker shaft is secured to a pair of arms 90 which are each connected at one end to a clevis 91 secured to the upper end of the respective hydraulic cylinders 70 and 72. A rocker shaft adjusting arm 92 projects forwardly from the rocker shaft 88 and has one of its ends connected to the rocker shaft and its other end connected to an extensible piston rod 93 which extends from a two-way adjusting cylinder 94. The two-way adjusting cylinder 94 is secured to the side frame element 50 of the main frame.

By means of the described fine adjustment subassembly 87, an adjustment of the precise position occupied in the earth by the tips or points of the blades or tines 26 is achieved by selectively extending or retracting the piston rod 93 of the adjusting cylinder 94 so as to cause the rocker shaft adjusting arm 92 to pivot up and down. This pivotal movement in turn causes rotation of the rocker shaft 88 and pivotation of the arms 90 carried on opposite ends thereof. As the free outer ends of the arms 90 move up or down, the cylinders 70 and 72 are accordingly slightly adjusted up or down in their positions, thus slightly elevating or lowering the main frame with respect to the ground engaging wheels 18.

As previously noted, the rotating weight subassembly 46 is provided on the upper side of the tool bar 22 for the purpose of imparting a vibratory or oscillating up and down directed force through the tool bar to the tines or blades 26. The rotating weight subassembly includes a housing 100 of generally rectangular configuration having a removable access panel 102 at the rear side thereof which is shown removed in FIG. 3 of the drawings. Inside the housing 100 are a plurality of adjustable weights or mass elements 104.

The weights or mass elements 104 are large thick metal plates of the configuration illustrated in FIGS. 3 and 4, and are keyed to a shaft 108 which extends through the housing 100 for rotation with this shaft. The position of weights 104 in relation to each other an the shaft 108 can be adjusted by changing the angular position of the weights about the shaft 108. The several weights 104 are secured in the selected positions by means of nut and bolt connecting means 105 extended through spaced clamping flanges carried at the ends of each of the weights (as shown in FIG. 4). By adjusting the weights in their positions relative to each other and their spacing about the shaft 108 in this manner, the nature of the vibratory movement imparted to the tool bar 22 and the tines or blades 26 can be selectively varied.

The shaft 108 is journaled in suitable bearing blocks 112 mounted in opposite sides of the housing 100. The shaft 108 projects through the journal blocks and housing 100 from a hydraulic motor 114 by which it is driven in rotation. The hydraulic motor 114 is supported upon the upper portion of a vertically extending supporting plate 116 which has its lower edge welded or otherwise suitably secured to the upper side of the tool bar 22, and which is braced and reinforced by diagonal brace plate 118. Hydraulic power fluid for operating the hydraulic motor 114 is supplied from the hydraulic pump 42 via a suitable control valve in the control panel. By means of this control system, it is possible to selectively vary the rotational speed of the hydraulic motor 114 and its output shaft 108. This affords a further selective control of the vibratory characteristics of the tool bar 22 and the blades or tines 26 connected thereto.

The vibrating frame 14 forming a part of the ripping apparatus of the invention includes a pair of horizontally spaced, substantially parallel, principal frame elements 120 and 122. The principal frame elements 120 and 122 of the vibrating frame 14 are positioned inside of, and extend parallel to, the side frame members 48 and 50 of the main frame chassis 10. The principal frame elements 120 and 122 project rearwardly from the rear end of the main frame 10, however, and each is connected at its rear end to the transversely extending tool bar 22.

At the forward end of each of the principal frame elements 120 and 122, each of these frame elements is connected through a horizontal pivot pin element 124 to one of the thrust absorbing arms 16. Each of the thrust absorbing arms 16 is an angulated element having a substantially horizontally and rearwardly extending upper portion 16a, and a downwardly extending forward portion 16b. The overall shape of one of the thrust absorbing arms 16 is best illustrated in FIG. 4 of the drawings. At a point below and spaced slightly forwardly from the pivot pin 124 by which each of the principal frame elements 120 and 122 is connected to its respective thrust absorbing arm 16 is a pivot pin 130 by which the respective thrust absorbing arm is pivotally connected between a pair of bracket plates 132. The bracket plates 132 are welded or otherwise suitably secured to the rear side of frame member 58 of the main frame 10.

At the rear end of each of the thrust absorbing arms 16, each of these arms is secured to a flat, horizontally extending spring stop plate 134. Each of the spring stop plates 134 is centrally apertured to receive an upwardly projecting spring guide shaft 135. Each of the spring guide shafts 135 is welded or otherwise suitably secured to the upper side of a respective one of the frame members 120 and 122 of the vibrating frame 14. Surrounding the lower portion of each spring guide shaft 135 is a helically coiled compression spring 136 which projects from the upper surface of the respective frame member 120 or 122 to the respective spring stop plate 134. Additional helically coiled compression springs 137 have their lower ends resting on the upper side of the respective spring stop plates 134 and project upwardly into abutting contact with adjustable spring cap nuts 138 threadedly retained on the threaded upper end of the respective spring guide shafts 135.

The vibrating frame 14 is pivotally mounted on the main frame 10 for cooperation, during the operation of the earth ripping apparatus, with a vibration damping subassembly 140. The vibration damping subassembly 140 includes an upper spring stop bar 142 which is bolted between the stanchions 66 and 68 at a location spaced downwardly from their upper ends. The damping subassembly 140 further includes a lower spring stop bar 144 of generally U-shaped configuration which is welded or otherwise suitably secured to the parallel side frame elements 48 and 50 of the main frame or chassis 10 and which projects downwardly therefrom, including a pair of parallel, vertically extending side plates 144a and a crossbar 144b. A horizontally extending divider plate 148 is secured at its opposite ends to the upper sides of the principal frame elements 120 and 122 of the vibrating frame 14, and is in vertical alignment with the upper spring stop bar 142 and the lower spring stop bar 144. The vibration damping subassembly 140 further includes a plurality of coil springs 152 which are positioned between the upper side of the spring divider plate 148 and the upper spring stop bar 142. A second group of coil springs 154 is positioned between the lower side of the spring divider plate 148 and the lower spring stop bar 144, as best illustrated in FIG. 6.

The disc delineator subassembly 30 is detachably connected to the rear portion of the vibrating earth ripping apparatus and functions to cause a fragmentation of subdivision of large chunks or blocks of an asphaltic or other paved surface when the ripping apparatus is utilized in order to remove such surfacing material from a roadbed or the like preparatory to resurfacing. The disc delineator subassembly 30 includes a elongated horizontally extending shaft 158 which has secured thereto at horizontally spaced locations therealong, a plurality of discs 160. The delineator subassembly 30 further includes a pair of forwardly extending connection arms 162 which are horizontally spaced so as to be located at opposite sides of the main frame 10 of the ripping apparatus. The connecting arms 162 are rotatably connected to the shaft 158 by means of suitable journals 164 so that the shaft and the discs 160 carried thereon are free to undergo rotation about the horizontally extending axis of the shaft.

The forward end of each connecting arm 162 is pivotally connected between a pair of bracket plates 166 which are secured to the underside of the lower spring stop bar 144. Each of the connecting arms 162 is provided over a portion of its length with a plurality of spaced apertures 168.

For the purpose of permitting the height of the shaft 158 and discs 160 in relation to the ground engaging wheels 18 to be adjusted, each threaded adjusting shaft 170 is threadedly engaged with an internally threaded bore formed through a swivel block 172 which is pivotally pinned between a pair of supporting plates 176. The upper end of each threaded adjusting shaft 170 carries a hex head 178 engageable by a suitable wrench. The lower end of each threaded adjustment shaft 158 carries a clevis bracket 180 having a pair of horizontally aligned apertures in opposite sides thereof. The clevis bracket 180 fits over and receives a respective one of the connecting arms 162, and can be engaged to the respective connecting arm by a suitable pin or bolt extended through the apertures in the opposite sides of the clevis bracket when they are in alignment with a selected one of the apertures 168 in the respective connecting arm. It will be apparent that when the shaft 158 and discs 160 are to be raised or lowered with respect to the main chassis 10 and ground engaging wheels 18, the threaded adjusting shafts 170 are threaded into or out of their respective swivel blocks 172.

It will be noted in referring to FIGS. 3, 5 and 6 of the drawings that the discs 160 of the disk delineator assembly 30 are disposed along the shaft 158 so that adjacent discs straddle or are spaced substantially equidistantly on opposite sides of the plane of one of the tines or chisel blades 26, and the discs are disposed forwardly of the chisel blades. This arrangement affords the required geometry of downwardly acting forces on the surface of an asphaltic layer at a proper location such that chunks or fragments of the asphalt plowed up by the blades or chisels 26 are fragmented or fractured into parts which are only approximately one half the size of those which would be developed if the chisel blades 26 alone were employed, and the disc delineator assembly 30 was not attached to the ripping apparatus.

OPERATION

In operating the vibrating earth ripping apparatus of the invention, it is necessary to initially determine whether the principal purpose of the work to be done is to plow or break up the earth, or whether an asphaltic, concrete or similar surface is to be fractured, ripped up and removed by means of the apparatus. In the latter event, the disc delineator subassembly 30 is attached to the rear end of the apparatus. For plowing or breaking up hardpan however, the disc delineator subassembly will generally not be used, and will be left off of the apparatus. This mode of operation will initially be described.

The engine 32 is started and drives hydraulic pump 42 so that various components of the apparatus can be hydraulically powered as hereinafter described.

Preparatory to using the vibrating earth ripping apparatus for plowing or chiseling the earth, a determination is made, based upon experience in use of the device, and the characteristics of the soil to be plowed or chiseled, of the depth at which the downwardly and forwardly curved chisel blades or tines 26 are to be set in the earth. In order to set the chisel blades 26 more deeply in the earth, the hydraulic cylinders 70 and 72 and their associated extensible piston rods 74 and 76 are initially actuated so as to retract or withdraw the piston rods into the cylinders by a pre-determined extent. This action lifts the ground engaging wheels 18 with respect to the main frame or chassis 10 so that the blades or tines 26 can set lower or deeper into the earth. The wheels 18 can be thus elevated due to their mounting on the A-frame subassemblies 20 which, in each case, are pivotally mounted at their forward ends to the pivot shafts 84 which are journaled to the chassis 10.

For a more precise and finer adjustment, the fine adjustment subassembly 87 incorporated in an alternate embodiment can be actuated by extending or retracting the piston rod 93 and the two-way adjusting cylinder 94. This action rotates the rocker shaft 88 through the adjusting arm 92 to thereby cause pivotation of the arms 90 carried at opposite ends of the rocker shaft. Pivotation of the arms 90 causes a slight upward or downward adjustment of the hydraulic cylinders 70 and 72. This, in turn, of course, causes the ground engaging wheels 18 to be moved slightly closer or slightly further from the main frame or chassis 10.

When the ground engaging wheels 18 have been set at the proper position to give precision in the depth to which blades 26 will plow, the rotating weight subassembly 46 is next adjusted to yield the type of vibrating motion which is desired as the ripping apparatus is moved forwardly. The rotating weight subassembly 46 is selectively adjusted by adjusting the angular relationship of the several adjustable weights or mass elements 104 on the shaft 108. Access to the weights 104 can, of course, be had by removing the removable access panel 102 carried at the rear side of the housing 100 of the rotating weight subassembly 46. Adjusting the weight 104 is accomplished by loosening the bolt connecting means 105 and changing the angular position of one or more of the weights 104 about the shaft 108. When the weights 104 are in alignment with each other, the maximum vibratory action or oscillation will be imparted to the vibrating frame 14 and blades 26 in the manner hereinafter described. When the weights 104 are symmetrically arrayed about the shaft 108, little or no blade vibration is developed by the vibrating earth ripping apparatus.

After the rotating weight subassembly 46 has been adjusted to impart the desired vibration to the tool bar 22, and through this tool bar to the blades 26, the hydraulic pump 42 delivers pressurized hydraulic fluid through the valve control system 82 to the hydraulic motor 114 of the rotating weight subassembly 46 and to the hydraulic cylinders 70 and 72 used for the major chassis-ground engaging wheel relationship adjustment, and to and the two-way adjusting cylinder 94 forming a part of the fine adjustment subassembly 87 where such is utilized.

When the appropriate valve in the valve control system 82 is thrown, the hydraulic motor 114 of the rotating weight subassembly 46 is energized to drive the shaft 108 in rotation. With rotation of the shaft 108, an oscillatory or vibrating movement is transmitted through this shaft to the tool bar 22 and the vibrating frame 14 upon which the rotating weight subassembly 46 is mounted as hereinbefore described. The vibratory motion thus developed causes an upward and downward and forward and rearward oscillating or vibrating movement to be undergone by the tool bar 22 and vibrating frame 14 as the hydraulic motor 114 drives the shaft 108 in rotation. The speed at which the shaft 108 is driven in rotation can be controlled at the valve control system 82 by the degree to which the control valve controlling the flow of hydraulic fluid to the hydraulic motor 14 is opened.

The vibrating earth ripping apparatus is, of course, connected to a towing vehicle through the towing tongue 64 carried at the forward end of the converging frame yolk elements 60 and 62 forming a part of the chassis 10. As the apparatus is moved forwardly under tow, the blades 26 are pulled through the earth and concurrently, undergo a rapid upward and downward oscillating or vibrating movement. This movement is imparted to the blades 26 by reason of their mounting, through the bracket pairs 24, to the transversely extending tool bar 22. The tool bar 22 is carried at the rear end of the vibrating frame 14, and thus the vibratory motion transmitted to the vibrating frame 14 from the rotating weight subassembly 46, as hereinbefore described, is transmitted to this frame from the tool bar 22 upon which the housing 100 of the rotating weight subassembly 46 is directly mounted.

The vibrating movement of the tool bar 22, as transmitted to the vibrating frame 14, is translated through the horizontally spaced principal frame elements 120 and 122 of the vibrating frame to the point where these principal frame elements are connected to the pair of moveable, thrust absorbing arms 16. As will be noted in referring to FIG. 4, each of the principal frame elements 120 and 122 is connected at its forward end to the respective moveable thrust absorbing arm 16 through a pivot pin 124. This point of pivotal connection between these structural elements is located above the points of pivotal connection of the thrust absorbing arms 16 to the pairs of bracket plates 132. These points are at the location of the pivot pins 135 by which the thrust absorbing arms are connected to these bracket pairs. Thus, the horizontal component of the vibratory motion developed by the rotating weight subassembly 46 is damped out by the ability of the thrust absorbing arms 16 to pivot about the pivot pins 130, so that the rear upper portion of these arms can pivot upwardly and forwardly when the arms receive a forward thrust or force transfer from the respective principal frame elements 120 and 122 of the vibrating frame 14. The propensity, at this time, of the thrust absorbing arms 16 to pivot upwardly and forwardly is resisted by the upper helically coiled compression springs 137. The springs 137 are positioned between the respective bracket plates 132 carried at the rear end of the respective thrust absorbing arms 16 and the adjustable spring cap nuts 138 which are threaded on the upper ends of the respective guide shafts 135 associated with each of the thrust absorbing arms.

At a time when the component of force developed by the rotating weight subassembly acts in a horizontally rearwardly acting direction, and the principal frame elements 120 and 122 of the vibrating frame 14 move rearwardly in relation to the main frame or chassis 10, the opposite component of force is thereby imparted to thrust absorbing arms 16. Stated differently, at this time, the arms 16 are caused to undergo a downward and rearward pivotal movement about the pivot pins 130. Each of the thrust absorbing arms 16 is, however, resiliently resisted in undergoing such movement by the helically coiled compression springs 136 which are positioned on the under side of the respective spring stop plates 134 carried on the ends of the thrust arms.

The jumping or loping jerking movement which would otherwise be developed where heavy vibration is being developed by the rotating weight subassembly 46 is substantially damped by the vibration damping subassembly 140. In this subassembly, helical compression springs are placed so as to resiliently oppose both upward and downward movement of the vibrating frame 14. Thus, the divider plate 148 is extended between the principal frame elements 120 and 122 of the vibrating frame 14, and above this divider plate, a group of coil springs 154 is positioned between the divider plate and the upper spring stop bar 142 secured between the vertically extending stanchions 66 and 68. Downward movement is opposed by coil springs positioned between the divider plate 148 and the lower spring stop bar 144 which is secured to, and projects downwardly from, the main chassis side frame elements 48 and 50 as shown in FIG. 6.

It will noted that the vertical position of the upper spring stop bar 142 on the vertically extending stanchions 66 and 68 can be adjusted so that the extent to which the coil springs 154 will dampen or retard upward movement of the vibrating frame 14 due to the action of the rotating weight subassembly 46 can be adjusted. This adjustment thus constitutes a further operational control, and increases the selectivity of the vibrating action which ultimately is imparted through the tool bar 22 to the blades or tines 26.

When used in the manner described, the vibrating earth ripping apparatus of the invention is very effective for breaking up hardpan and thoroughly penetrating hard or rocky soil. Quite importantly, in the use of the vibrating earth ripping apparatus, the thrust absorbing arms 16 function quite well to prevent a hunching or jerking motion of the entire chassis of the ripping apparatus in a forward then rearward direction as the horizontal component of force developed by the eccentric asymmetry of the weights 104 on the shaft 108 is transferred through the vibrating frame to the shock absorbing arms.

When it is desired to rip up an asphaltic or blacktop surface using the ripping apparatus of the invention, the disc delineator subassembly 30 is attached to the rear of the ripping apparatus. This is accomplished by extending the forwardly extending connection arms 162 of the delineator subassembly to the points beneath the main frame where their forward ends can be joined by pivotal connection to the pairs of bracket plates 166. A connection of the delineator subassembly to the chassis 10 in this fashion will cause the discs 160 carried on the horizontally extending shaft 158 to straddle the planes in which the blades 26 are located, as previously explained, and to be located ahead of the chisel blades.

The vertical position of the plurality of discs 160 is then adjusted by means of the threaded adjusting shafts 170. A suitable socket type wrench is engaged with the hex heads 178 of these shafts and they are then threaded downwardly or upwardly in their respective swivel blocks 172. The axial upward or downward movement of the threaded adjusting shafts 170 causes the forwardly extending connection arms 162 to be pivoted about their points of pivotal connection to the frame at the forward end of the connection arms, and this in turn causes a raising or lowering of the shaft 158 and the discs 160 carried thereon. When the position of the discs 160 has been adjusted in correlation to the depth to which the blades 26 will be allowed to penetrate the asphaltic surface, and so as to cause the discs to exert a reasonably large downward pressure on the upper side of the asphalt, the ripping apparatus is ready to commence the asphalt fracturing and removal process.

As previously described, the towing tongue 64 is connected to the towing vehicle as this time, and the vibratory motion of the tool bar 22 derived from the rotating weight subassembly 46 mounted thereon is commenced by proper operation of the valve control system 82 to direct hydraulic power fluid to the hydraulic motor 114. As the apparatus moves forwardly, the blades 26 are pulled forward through the asphalt, and are concurrently caused to oscillate or vibrate with a rapid vibratory up and down motion. The blades 26 also, of course, have a forward and rearward component of vibration due to the eccentricity of the weights 104 on the shaft 108. As the blades 26 rip through the asphalt, large chunks or plates of asphalt are medially fractured by the downward pressure of the disc 160 of the delineator subassembly. Generally, the platelets or fragments of asphalt which result from the combined action of the discs 160 of the delineator subassembly 30 and the tines or blades 26 are sufficiently small that a back hoe or relatively small loading device can be used to load these chunks or pieces of asphalt into dump trucks to be hauled away from the site being cleared to a suitable asphalt reprocessing plant.

In addition to the usages described, the ripping apparatus of the invention can also be used to fracture concrete pavement or surfaces. Generally, where this purpose is to be achieved, differently shaped tines or blades may be used in place of the type of blades 26 illustrated as characteristic of the embodiment of the invention which is herein described. The particular vibratory motion employed will also be tailored or selectively set to accomplish the fracturing or fragmentation of the type of surfacing material which is being subjected to the action of the ripping apparatus.

Although a preferred embodiment of the invention has been herein described, it will be understood that various changes and modifications of the specific preferred embodiment which has been herein illustrated and described in the foregoing discussion can be effected without departure from the basic principles which underlie the invention. Changes and innovations of this type are therefore deemed to lie within the spirit and scope of the invention, except as the same may be necessarily limited by the appended claims, or reasonable equivalents thereof.

What is claimed is:

1. A vibrating earth ripping machine comprising:
    a wheel supported main frame;
    a pair of movable thrust absorbing arms pivotally connected to said main frame;
    a vibrating frame pivotally connected to the main frame through said pair of movable thrust absorbing arms;
    shock absorbing springs positioned between said vibrating frame and said thrust absorbing arms for damping vibratory movement of said vibrating frame and said shock absorbing arms;
    a tool bar secured to the rear end portion of the vibrating frame;
    ripper teeth detachably secured to said tool bar and projecting downwardly therefrom;
    a vibration developing rotating weight subassembly mounted on said tool bar; and
    a vibration damping subassembly mounted between the main frame and the vibrating frame for damping vibratory movement of said vibrating frame.

2. A vibrating earth ripping machine according to claim 1 and further characterized as including:
    a disc delineator subassembly detachably connected to the rear of said main frame and cooperating with said ripper teeth for subdividing pavement ripped up by said ripper teeth.

3. A vibrating earth ripping machine according to claim 2 wherein said disc delineator subassembly comprises:
    an elongated horizontally extending shaft;
    a plurality of spaced discs keyed to said shaft for rotation therewith and spaced therealong;
    forwardly extending connecting arms having one end journalled on said shaft and a second end adapted to be pivotally connected to said main frame; and
    adjusting means connected between said main frame and said connecting arms for adjustably positioning said shaft and discs in relation to the ground.

4. A vibrating earth ripping machine according to claim 1 and further characterized as including:
    a pair of A-frames pivotally mounted on said main frame;
    a ground engaging wheel carried on each of said A-frames at a location spaced from the point of pivotal connection of the respective A-frame to the main frame; and
    a piston and cylinder means connected between the main frame and each of the A-frames at a location near the ground engaging wheel carried thereon for adjusting the height of the main frame above the ground engaged by said ground engaging wheels.

5. A vibrating earth ripping machine according to claim 4 wherein said vibration damping subassembly comprises:
 a pair of vertically extending parallel stanchions mounted on said main frame and projecting upwardly therefrom;
 an upper spring stop bar connected between the upper ends of said vertically extending parallel stanchions;
 a horizontally extending lower spring stop bar connected transversely across said main frame and spaced downwardly from, and extending substantially parallel to, said upper spring stop bar;
 a divider plate connected to said vibrating frame and disposed between, and extending substantially parallel to, said upper and lower spring stop bars;
 helical compression springs positioned between said divider plate and said upper spring stop bar, and between said divider plate and said lower spring stop bar, to resiliently oppose upward and downward movement of said vibrating frame relative to said main frame.

6. A vibrating earth ripping machine according to claim 5 wherein said vibrating frame comprises:
 a pair of horizontally extending, substantially parallel principle frame elements having said tool bar connected across one of the ends thereof, and having the forward ends thereof connected to said thrust absorbing arms;
 and wherein each of said thrust absorbing arms comprises:
 a vertically downwardly extending portion pivotally joined at its lower end to said main frame and having a point of pivotal connection to the forward end of one of said principle frame elements of said vibrating frame, said point of pivotal connection being spaced upwardly from the point where said downwardly extending portion is connected to said main frame; and
 a horizontally extending portion connected to the upper end of said downwardly extending portion and projecting rearwardly therefrom over one of said principle frame elements.

7. A vibrating earth ripping machine acording to claim 6 and further characterized as including a disc delineator subassembly detachably connected to the rear of said main frame and cooperating with said ripper teeth for subdividing pavement ripped up by said ripper teeth.

8. A vibrating earth ripping machine according to claim 7 wherein said disc delineator subassembly comprises:
 an elongated horizontally extending shaft;
 a plurality of spaced discs keyed to said shaft for rotation therewith and spaced therealong;
 forwardly extending connecting arms having one end journalled on said shaft and a second end adapted to be pivotally connected to said main frame; and
 adjusting means connected between said main frame and said connecting arms for adjustably positioning said shaft and discs in relation to the ground.

9. A vibrating earth ripping machine according to claim 4 and characterized as further including means for hydraulically finely adjusting the height of the main frame above the ground.

10. A vibrating earth ripping machine according to claim 1 wherein said vibration damping subassembly comprises:
 a pair of vertically extending parallel stanchions mounted on said main frame and projecting upwardly therefrom;
 an upper spring stop bar connected between the upper ends of said vertically extending parallel stanchions;
 a horizontally extending lower spring stop bar connected transversely across said main frame and spaced downwardly from, and extending substantially parallel to, said upper spring stop bar;
 a divider plate connected to said vibrating frame and disposed between, and extending substantially parallel to, said upper and lower spring stop bars;
 helical compression springs positioned between said divider plate and said upper spring stop bar, and between said divider plate and said lower spring stop bar, to resiliently oppose upward and downward movement of said vibrating frame relative to said main frame.

11. A vibrating earth ripping machine according to claim 1 wherein said vibrating frame comprises:
 a pair of horizontally extending, substantially parallel principal frame elements having said tool bar connected across one of the ends thereof, and having the forward ends thereof connected to said thrust absorbing arms;
 and wherein each of said thrust absorbing arms comprises:
 a vertically downwardly extending portion pivotally joined at its lower end to said main frame and having a point of pivotal connection to the forward end of one of said principal frame elements of said vibrating frame, said point of pivotal connection being spaced upwardly and rearwardly from the point where said downwardly extending portion is connected to said main frame; and
 a horizontally extending portion connected to the upper end of said downwardly extending portion and projecting rearwardly therefrom over one of said principal frame elements.

12. A vibrating earth ripping apparatus comprising:
 a wheel supported main frame having a forward end and a rear end;
 a pair of thrust absorbing arms having each arm pivotally connected to the main frame for pivotation about a horizontal pivotal axis;
 a vibrating frame having a rear end having a forward end pivotally connected to said thrust absorbing arms at pivot points spaced from said pivotal axis for pivotally transferring forward and then rearward thrust to said thrust absorbing arms to thereby pivot said thrust absorbing arms upwardly then downwardly about said pivotal axis;
 means resiliently opposing upward and downward pivotal movement of said thrust absorbing arms, said resilient opposing means beng mounted between said vibrating frame and said thrust absorbing arms;
 teeth connected to the rear end of said vibrating frame for movement with said vibrating frame;
 means for developing periodically recurring, variously directed movements of said vibrating frame;
 means resiliently resisting upward movement by said vibrating frame; and
 means for hydraulically selectively adjusting the depth to which said teeth penetrate the earth while said vibrating frame is undergoing said variously directed, periodically recurring movements.

13. A vibrating earth ripping machine comprising:

a wheel supported main frame;

a pair of movable thrust absorbing arms pivotally connected to said main frame;

a vibrating frame pivotally connected to the main frame through said pair of movable thrust absorbing arms;

shock absorbing springs positioned between said vibrating frame and said thrust absorbing arms for damping vibratory movement of said vibrating frame and said shock absorbing arms;

a tool bar secured to the rear end portion of the vibrating frame;

ripper teeth detachably secured to said tool bar and projecting downwardly therefrom;

a vibration developing rotating weight subassembly supported with said tool bar on said vibrating frame for imparting and up-and-down movement to said tool bar and the ripper teeth carried thereon; and a vibration damping subassembly mounted between the main frame and the vibrating frame for damping vibratory movement of said vibrating frame.

* * * * *